United States Patent Office 2,849,707
Patented Aug. 26, 1958

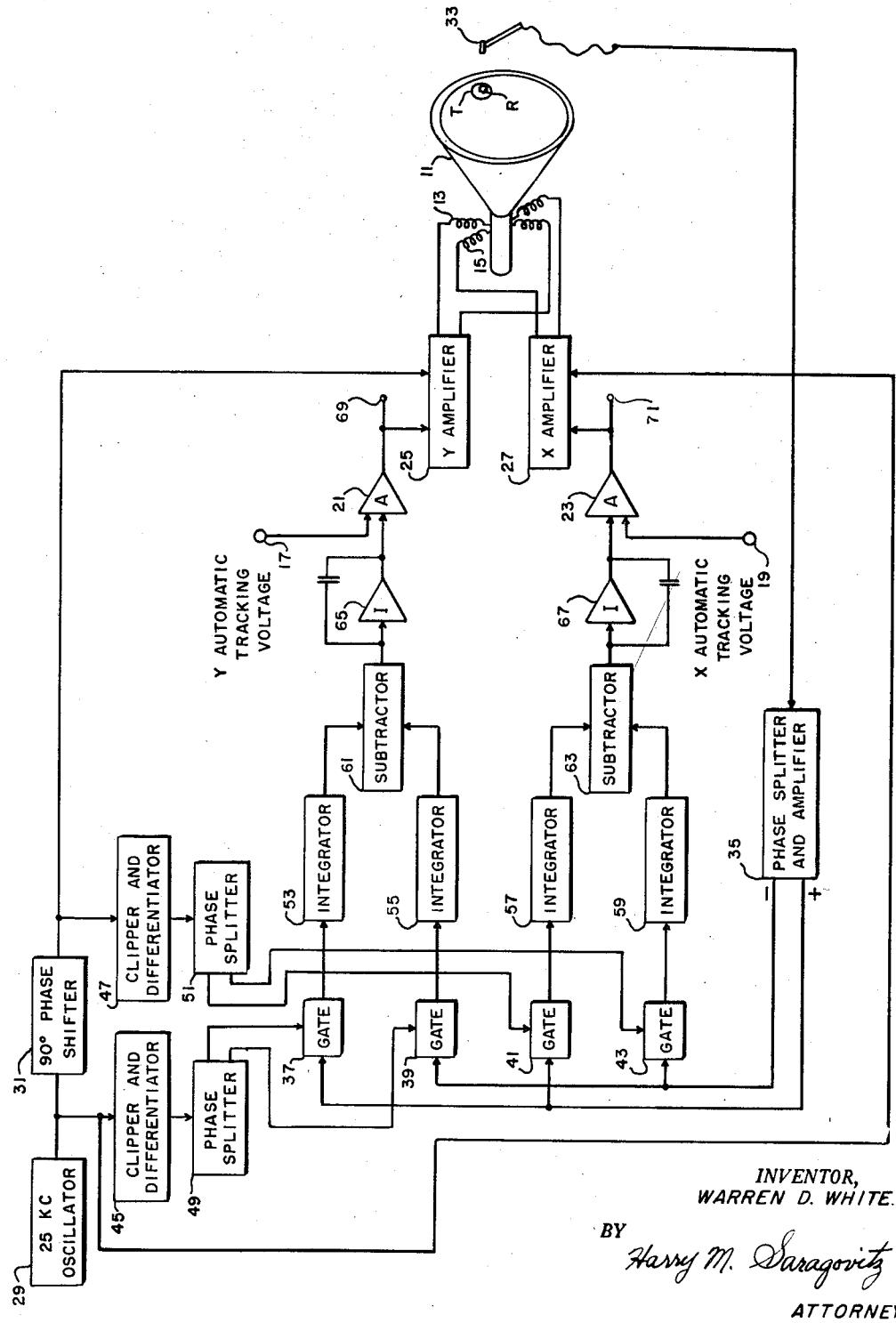

2,849,707

POSITION CORRECTING MEANS FOR TRACK-WHILE-SCAN CHANNELS

Warren D. White, East Norwich, N. Y., assignor to the United States of America as represented by the Secretary of the Army Application May 9, 1955, Serial No. 507,750

7 Claims. (Cl. 343—7.3)

The present invention relates to a manually operable means for correcting the predicted position of a target as computed by a track-while-scan channel used with a radar system.

It is known that a continuously scanning radar system may be equipped with one or more automatic track-while-scan channels which predict the position of targets scanned by the radar beam. In general, a track-while-scan channel is usually provided for each target that is to be tracked. Each track-while-scan channel is gated in both range and azimuth so that it responds to reflected radar pulses from its assigned target during each scan of the radar system. The track-while-scan channel utilizes the observed target position on each scan and the history of target positions on previous scans to predict a future target position and to shift its gate voltages accordingly. The track-while-scan channel is actually a computer and may develop its output or predicted position in terms of voltages, shaft rotations or other desired quantities.

Inasmuch as track-while-scan channels must depend upon past position observations of the target for their information they are subject to error should a moving target suddenly change its course or adopt evasive tactics. Means are usually provided, therefore, to allow the operator of a track-while-scan channel to manually correct the predicted target position of the channel when he notes that the predicted position is sufficiently displaced from the observed target position. The degree of correction required for an observed error has in the past been determined by the operator, and the agreement between the corrected predicted position and the observed position thus depended largely upon his skill.

The system, according to the present invention, relates to an improved manually operable means for inserting correction voltages to a track-while-scan channel. The improved correction means ensures that the operation by the operator will automatically result in the proper amount of correction to reestablish coincidence between the predicted and observed positions. The proper degree of correction may be obtained by an operator of mediocre skill who need only judge when a correction of the system is necessary.

It is the principal object of the present invention to provide an improved prediction correcting means for a track-while-scan channel.

It is a further object of the present invention to provide a prediction correcting means which semi-automatically provides the proper amount of correction to cause the predicted position to coincide with the observed position.

It is a still further object of the invention to reduce the degree of operator skill required for proper operation of a prediction correcting device.

Other objects and many attendant advantages of the invention will become readily apparent as the same becomes better understood from the following detailed description and the accompanying drawings wherein:

The single figure of the drawing is a schematic drawing, in block diagram form, of a novel predicted position correction system constructed in accordance with the principles of the invention.

The system, according to the present invention, will be described in conjunction with a track-while-scan channel which predicts target position in terms of a pair of voltages which are representative of the rectangular coordinates of the position. It is to be understood, however, that while the correction system is described in conjunction with a rectangular coordinate track-while-scan channel it is not limited to such use.

The track-while-scan indicator illustrated in the drawing consists of a cathode ray tube 11 having a pair of magnetic deflecting coils 13 and 15. The deflecting coils are located on the neck of the cathode ray tube and are placed perpendicular to the tube axis and are oriented at 90° with respect to one another in the usual manner. The cathode ray tube 11 has a screen of the long persistence type and is used in the present system as a dual purpose indicator. It first presents the observed target positions as detected by the scanning radar system. The observed target positions are shown by luminescent indications such as that represented by R on the face of the tube. The tube is also used to indicate the operation of the track-while-scan channel by showing the predicted target position by the circular trace or tag circle represented at T on the face of the tube.

The observed target position representation R is produced by conventional plan-position-indicator techniques. Azimuth and range sweep voltages may be applied to the magnetic deflection coils 13 and 15 to cause the electron beam of the tube to follow the rotating radial sweep pattern normally used in such systems. The reflected radar pulse information from the various targets is used to intensity modulate the electron beam and produce the representations R.

The tube 11 is also used to indicate the predicted position of particular targets as computed by the track-while-scan channels. The predicted positions are represented by circular representations or "tags" such as that shown at T. The tag circles are centered about the predicted range and position of a particular target.

Both the observed target representation R and the predicted target position representation T appear on the screen at the same time. This may be accomplished in either of two ways. Electronic switching circuits triggered by the range sweep voltage of the radar system may be used. In this case the observed position representation of the target is "written" on the tube screen during the radial range sweep of the radar system. Upon completion of the range sweep the track-while-scan system is connected to the cathode ray tube deflection elements to "write" the tag circle or predicted target position on the face of the tube. This can be done during the period when the indicator tube of a normal plan-position-indicator system would be blanked for the return of the sweep. If, for any reason, an electronic switching system such as generally described above is not desirable, a plural gun cathode ray tube system, such as that described in United States Patent No. 2,603,775 issued to Rodney D. Chipp on July 15, 1952, may be used. The plural gun type tube would be provided with separate deflection elements for each gun thus rendering electronic switching unnecessary. Both systems for the simultaneous presentation of the two sets of data are well known in the art and form no part of the present invention. The apparatus necessary to accomplish the simultaneous presentation has therefore been omitted from this description.

The reflected radar video information from the radar system is fed to one or more track-while-scan channels. The track-while-scan channels operate under the control of properly established range and azimuth gate voltages to feed the position data from a selected target to their internal computer systems. Each track-while-scan channel predicts the position of its particular target from the observed position data obtained from that target over a plurality of scans of the radar system. Track-while-scan systems of this general type are disclosed in United States Patent No. 2,624,877 issued to Britton Chance on January 6, 1953, and in the copending application of Richard N. Close, Serial No. 507,749, filed May 9, 1955.

The output from the present track-while-scan channel is in terms of a pair of slowly varying direct-current voltages representative respectively of the north-south and east-west coordinates of the predicted target position. These output voltages are applied to the automatic tracking voltage terminals 17 and 19.

The rectangular coordinate track voltages applied to terminals 17 and 19 are fed through direct current amplifiers 21 and 23, and summing amplifiers 25 and 27 to the magnetic deflection coils 13 and 15 respectively. It will be apparent that the deflection coils under the action of the voltages applied thereto would cause the electron beam to assume a position on the face of the tube representative of the predicted target position. If, however, the automatic track-while-scan channel is functioning properly this beam position would fall at the same point on the screen as the observed target representation R derived from the scanning radar system. Any luminescence of the screen caused by this beam would therefore be indistinguishable from that of the observed target position. This difficulty is overcome by the application of a pair of dephased alternating voltages to second input circuits of the summing amplifiers 25 and 27 to cause the predicted position beam to sweep in a circular pattern centered about the predicted position.

The dephased alternating voltages are derived from a source such as an oscillator 29 which may be operated at any convenient frequency, for example, in the neighborhood of twenty-five kilocycles per second. The output of the oscillator 29 is fed directly to the second input of the summing amplifier 27, and through a 90° phase shifting network 31, to the second input of the summing amplifier 25. The dephased alternating voltages superpose a rotating field effect upon the deflection position established by the tracking voltages. This results in the electron beam being swept in a circular pattern to establish the tag circle representation shown at T on the face of the cathode ray tube screen.

The configuration of the tag circle enables the operator of the track-while-scan channel to determine readily if the tracking output data of the channel is correct. If the channel is tracking properly the target representation R will be centered within the tag circle T. Any deviation of the target representation R from the centered position is readily apparent and indicates that the tracking channel output is incorrect. The track-while-scan channel itself can correct minor variations but may require an additional manual correction should the deviation become too great.

A photoelectric pickup device 33 is used to effect manual corrections in the position of the tag circle T. The pickup device may be of a size comparable to that of an ordinary lead pencil and contains a photoelectric cell which may, for example, be of the commercially available type 1P42. When it is desired to effect a correction the operator places the pickup device 33 in a position centered over the observed target position representation R on the face of the screen and closes a switch (not shown) to place the correction apparatus in operation. The manual correction is made on the persistent image of the target representation R just after the sweep line has gone by.

The photoelectric pickup responds to the light falling thereon to produce an electrical output. The light intensity, due to the target representation at R, remains substantially constant after the passage of the radar sweep since the screen in this area is not being activated by the electron beam. Light is, however, being supplied to the photocell from the tag circle representation at T produced by the circularly sweeping beam. The intensity of illumination on the photoelectric pickup at any instant is dependent upon the distance of the scanning beam at that instant from the pickup. If the pickup placed over the target representation R is centered in the tag circle T the light intensity from this source will be constant at all times. If, however, the pickup is not centered within the tag circle the light intensity will vary and the output of the pickup will include an alternating current component at the frequency of the circular sweep. The alternating component will have a relative phase position determined by the location of the tag circle with respect to the pickup 33.

The electrical output from the pickup is fed to a phase splitter and amplifier circuit 35. The phase splitter and amplifier circuit produces a pair of oppositely poled output voltages, each varying in level with the instantaneous magnitude of the voltage from the photoelectric pickup 33. The outputs of the phase splitter and amplifier circuit have been designated by plus and minus signs on the drawing to indicate the nature of the output voltages.

The positive output voltage from the phase splitter and amplifier 35 is applied as an input to a pair of normally closed gate circuits 37 and 41. The negative output voltage from the phase splitter and amplifier circuit is applied to a similar pair of gate circuits 39 and 43. The gate circuits 37, 39, 41 and 43 are controlled by voltages developed from the output voltage of the oscillator 29, and the gating voltages are arranged to open the gate circuits in a 90° sequential relationship. The 90° dephased output voltages derived from the oscillator output voltage are fed through a pair of clipper and differentiator circuits 45 and 47 which act in a known manner to produce accurately timed voltage pulses. The timed voltage pulses are fed to phase splitter circuits 49 and 51. The outputs derived from the phase splitter circuits 49 and 51 consist of four equally spaced positive going pulses accurately spaced by equal 90° periods over a cycle of the output voltage of oscillator 29.

It will be remembered that the circular sweep for the tag circle was derived from the oscillator frequency. Effectively then the gate voltages divide the tag circle representation produced by this sweep into equal quadrants. Each of the gate circuits actuated by these voltages passes the output of the photoelectric pickup 33 during the travel of the sweeping beam through the respective quadrant of the circle associated with the particular gate.

The sequentially gated outputs from the photoelectric pickup are applied to integrator circuits 53, 55, 57 and 59. Integrator 53 stores the positive polarity pulses from a first quadrant of the sweep. Integrator 55 stores the negative polarity pulses from a third quadrant which is displaced 180° from the first quadrant. In a similar fashion, integrator 57 stores positive polarity pulses from the second quadrant and integrator 59 stores negative pulses from the fourth quadrant. The stored output voltages of integrators 53 and 55 are combined in a "subtractor" circuit 61, which may be a summing amplifier producing an output proportional to the algebraic sum of the input voltages. The difference between the two inputs is representative of the error of centering of the tag circle with respect to the photoelectric pickup. This error is measured in a direction of a line drawn through the associated quadrants of the tag circle. In a similar fashion, the output voltages of integrators 57 and 59 are combined in a "subtractor" circuit 63 to produce an error voltage in a direction through the other two quadrants or perpendicular to the first error.

The resultant error voltage obtained from the "subtractor" circuit 61 is applied as an input to an integrator circuit 65, which stores a voltage representative of the error of position of the tag circle in a vertical or Y direction. This stored error voltage may be either positive or negative, depending upon the direction of the tracking error. The stored tracking error voltage is applied as a second input to the summing amplifier circuit 21. The stored tracking error voltage adds to, or subtracts from, the automatic tracking voltage applied to terminal 17, and the resultant output of the summing amplifier 21 is such as to change the energization of deflection coil 13 and shift the position of the electron beam in cathode ray tube 11 to cause the center of the tag circle to correspond with the observed target position.

The correction in a horizontal direction is achieved in the same manner. The tracking error output of the "subtractor" circuit 63 is integrated in the integrator 67 and applied as a second input to the summing amplifier 23. The tracking error voltage combines with the previously described automatic tracking voltage applied to terminal 19, the energization of the horizontal deflection coil 15 is changed accordingly and the electron beam changes position horizontally. When both horizontal and vertical corrections have been made in this manner the tag circle will be properly centered about the target representation R. When the tag circle becomes properly centered the alternating component of the photoelectric pickup voltage disappears and the position correction system ceases to function.

A pair of output terminals 69 and 71 are connected to the output circuits of the summing amplifiers 21 and 23 respectively. The voltages existing at these terminals are the corrected vertical and horizotnal tracking voltages of the target and represent the rectangular coordinates of the predicted target position. These terminals 69 and 71 may be connected to any computer or other system intended to operate on rectangular coordinate position data.

The system as described above is in the nature of a self-balancing servo amplifier loop. The system detects the magnitude of tracking error in two dimensions from the observed target position. It automatically generates error correction voltages of the proper magnitude to correct the detected error. The operator need only place the photoelectric pickup device over the observed target position when he notes that a tracking error exists. The system then functions to supply the proper correction voltages to reestablish proper tracking. The operator is not required to estimate the degree of correction required and the degree of operator skill required is consequently reduced. A single operator, utilizing the improved error correction circuit described, can supervise the automatic tracking of a larger number of targets and can at the same time attain a closer degree of tracking than can be obtained by the use of wholly manual apparatus.

It will be apparent to those skilled in the art that in the light of the present disclosure the invention may be practiced other than as specifically described herein. It is, therefore, to be understood that the scope of the present invention is defined solely in terms of the appended claims.

What is claimed is:

1. A tracking error correction system for application to an automatic track-while-scan channel connected to a radar system, comprising a cathode ray display tube responsive to the radar system to display the actual position of a target, circuit means including a source of relatively dephased alternating voltages and responsive to the output of said track-while-scan channel to produce a tag circle on the face of said display tube centered about the target position predicted by said track-while-scan channel, a movable photoelectric pickup means adapted to be placed over the observed target position on the face of said display tube and means responsive to the output of said photoelectric pickup means and to said relatively dephased alternating voltages to develop error voltages representative of the positional error between said predicted and observed target position.

2. A tracking error correction system for application to an automatic track-while-scan channel connected to a radar system, comprising a cathode ray display tube responsive to the radar system to display the actual position of a target, circuit means including a source of relatively dephased alternating voltages and responsive to the output of said track-while-scan channel to produce a tag circle on the face of said display tube centered about the target position predicted by said track-while-scan channel, a movable photoelectric means adapted to be placed over the observed target position on the face of said display tube, means responsive to the output of said photoelectric pickup means and to said relatively dephased alternating voltages to develop error voltages representative of the positional error between said predicted and observed target positions and means applying said error voltages to the input of said means responsive to the output of said track-while-scan channel to correct the tag circle position on the face of said display tube.

3. A tracking error correction system for application to an automatic track-while-scan channel connected to a radar system, comprising a cathode ray display tube responsive to the radar system to display the actual position of a target, deflection means for said cathode ray tube responsive to the output of said track-while-scan channel to deflect the beam of said tube toward a position on the face of said tube which is representative of the predicted target position, a source producing a pair of relatively dephased alternating voltages connected to the input of said deflection means to cause said beam to sweep in a tag circle about said predicted target position, a movable photoelectric pickup means adapted to be placed on the face of said display tube in a position representative of the observed target position, a plurality of gate circuits controlled in synchronous relationship to said dephased alternating voltages and means connected to the output of said photoelectric pickup means through said gate circuits to develop error voltages representative of the positional error between said predicted and observed target positions.

4. A tracking error correction system for application to an automatic track-while-scan channel connected to a radar system, comprising a cathode ray display tube responsive to the radar system to display the actual position of a target, deflection means for said cathode ray tube responsive to the output of said track-while-scan channel to deflect the beam of said tube toward a position on the face of said tube which is representative of the predicted target position, a source producing a pair of relatively dephased alternating voltages connected to the input of said deflection means to cause said beam to sweep in a tag circle about said predicted target position, a movable photoelectric pickup means adapted to be placed on the face of said display tube in a position representative of the observed target position, a plurality of gate circuits controlled in synchronous relationship to said dephased alternating voltages, error detecting means connected to the output of said photoelectric pickup means through said gate circuits and means responsive to the output of said error detecting means for shifting the position of said beam on the face of said cathode ray display tube.

5. In a manual correction system for an automatic track-while-scan channel the combination comprising a cathode ray display tube having a luminescent face, deflection elements for the electron beam of said cathode ray display tube, means to apply direct current output voltages from said track-while-scan channel to said deflection elements to establish a predicted target position of the electron beam on the face of said display tube, means to superpose a pair of relatively dephased sinusoidal alternating voltages on said deflection elements to cause said electron beam to sweep in a circular trace on the face of said display tube, a photoelectric means positioned adjacent the face of said display tube to respond to the luminescence produced by said electron beam and gated integrator means responsive to the output of said photoelectric means to apply additional voltages to said deflection elements.

6. In a manual correction system for an automatic track-while-scan channel the combination comprising a cathode ray display tube having a luminescent face, deflection elements for the electron beam of said cathode ray display tube, means to apply direct current output voltages from said track-while-scan channel to said deflection elements to establish a predicted target position of the electron beam on the face of said display tube, means to superpose a pair of relatively dephased sinusoidal alternating voltages on said deflection elements to cause said electron beam to sweep in a circular trace on the face of said display tube, a photoelectric means positioned adjacent the face of said display tube to respond to the luminescence produced by said electron beam and phase-responsive integrator means connected to the output of said photoelectric means and to at least one of said pair of relatively dephased sinusoidal alternating voltages to apply additional voltages to said deflection elements.

7. In a manual correction system for an automatic track-while-scan channel the combination comprising a cathode ray display tube having a luminescent face, deflection elements for the electron beam of said cathode ray display tube, means to apply direct current output voltages from said track-while-scan channel to said deflection elements to establish a predicted target position of the electron beam on the face of said display tube, a source of quadrature related sinusoidal alternating voltages, means to apply said alternating voltages to said deflection elements to cause said electron beam to sweep in a circular trace on the face of said display tube, a manually positionable photoelectric means adjacent the face of said display tube responsive to the luminescence produced by said electron beam, and gated integrator means jointly responsive to the output of said photoelectric means and said quadrature related sinusoidal alternating voltages to apply additional voltages to said deflection elements.

No references cited.